(12) United States Patent
Kataoka

(10) Patent No.: US 7,504,807 B2
(45) Date of Patent: Mar. 17, 2009

(54) SWITCHING REGULATOR WITH VOLTAGE STEP UP OR PASS IN STANDBY MODE AND WITH VOLTAGE STEP UP/STEP DOWN IN NORMAL OPERATION MODE

(75) Inventor: Shinichiro Kataoka, Osaka (JP)

(73) Assignee: Panasonic Corporation, Osaka (JP)

( * ) Notice: Subject to any disclaimer, the term of this patent is extended or adjusted under 35 U.S.C. 154(b) by 410 days.

(21) Appl. No.: 11/349,215

(22) Filed: Feb. 8, 2006

(65) Prior Publication Data

US 2006/0186867 A1    Aug. 24, 2006

(30) Foreign Application Priority Data

Feb. 9, 2005    (JP) ............................... 2005-032399

(51) Int. Cl.
G05F 1/59    (2006.01)
(52) U.S. Cl. ........................... 323/268; 307/85; 323/259
(58) Field of Classification Search ................. 323/268, 323/259, 284, 222, 271, 272, 350; 307/85, 307/82, 86, 80; 363/65
See application file for complete search history.

(56) References Cited

U.S. PATENT DOCUMENTS

| | | | | |
|---|---|---|---|---|
| 5,161,097 A | * | 11/1992 | Ikeda | 363/124 |
| 6,400,589 B2 | * | 6/2002 | Abo et al. | 363/65 |
| 6,677,734 B2 | * | 1/2004 | Rothleitner et al. | 323/259 |
| 6,762,595 B2 | * | 7/2004 | Tamai et al. | 323/266 |

FOREIGN PATENT DOCUMENTS

| | | |
|---|---|---|
| JP | 2001-69749 | 3/2001 |
| JP | 2005-160163 | * 6/2005 |

* cited by examiner

*Primary Examiner*—Akm E Ullah
*Assistant Examiner*—Harry Behm
(74) *Attorney, Agent, or Firm*—Steptoe & Johnson LLP (57) ABSTRACT

In a standby mode, a voltage step up DC/DC converter 5 supplies a power output voltage equal to or higher than a second set voltage which is lower than a first set voltage in a normal operating mode to a microcomputer (load) 1 with current supply performance which is smaller than in the normal operating mode. On the other hand, in the normal operating mode, a voltage step up/step down DC/DC converter 4 supplies the first set voltage in the normal operating mode to the microcomputer 1.

6 Claims, 10 Drawing Sheets

PRIOR ART

FIG. 12

PRIOR ART

SWITCHING REGULATOR WITH VOLTAGE STEP UP OR PASS IN STANDBY MODE AND WITH VOLTAGE STEP UP/STEP DOWN IN NORMAL OPERATION MODE

FIELD OF THE INVENTION

The present invention relates to a switching regulator.

BACKGROUND OF THE INVENTION

A switching regulator is conventionally used for a power circuit of portable equipment which reproduces a compact disc (CD), mini disc (MD) or the like to output a power output voltage obtained by converting the voltage of a battery which is a supply voltage source on the primary side to a set voltage to a load on the secondary side. For example, JP A2001-69749 proposes a switching regulator shown in FIG. 11.

Figure 11:
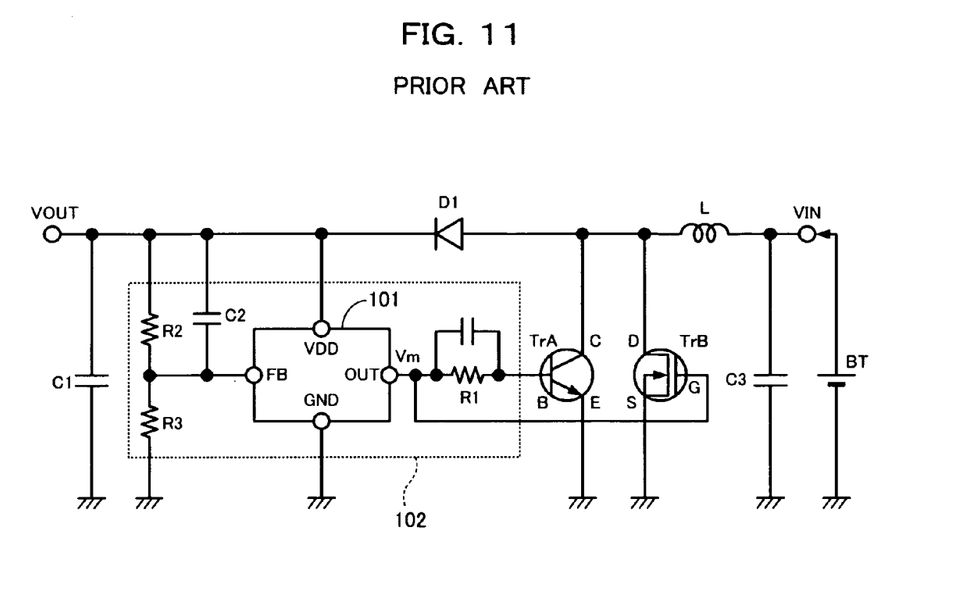
FIG. 11 shows the schematic construction of a conventional switching regulator.

The conventional switching regulator shown in FIG. 11 uses the construction of a voltage step up DC/DC converter. That is, the present switching regulator steps up a power input voltage (battery voltage) VIN from a battery which is a supply voltage source BT on the primary side to a set voltage through a switching operation of a bipolar transistor TrA which is a coil drive transistor and field effect transistor (power MOS-FET) TrB and outputs it to the load on the secondary side.

Figure 12:
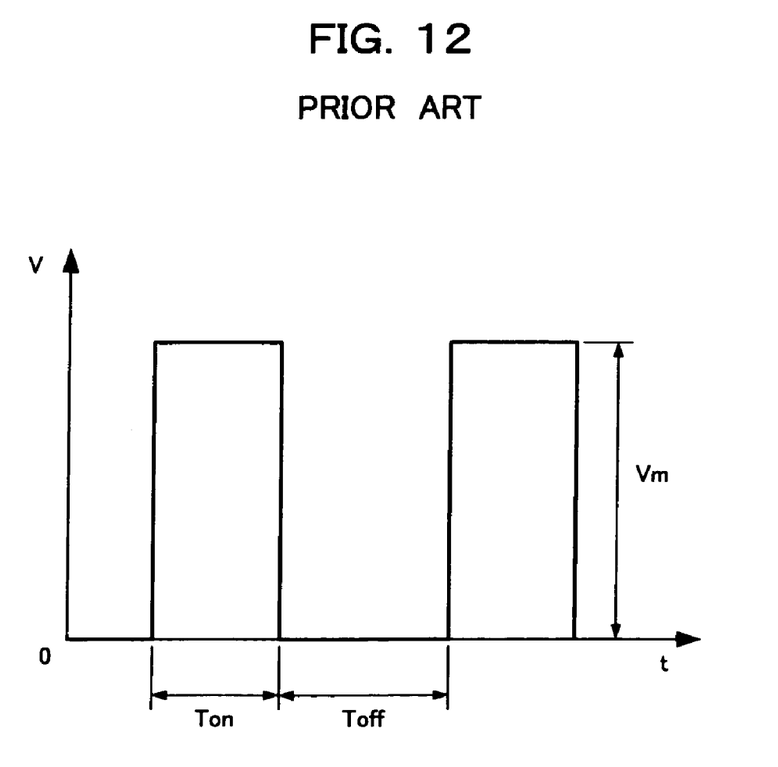
FIG. 12 illustrates a pulse signal which drives a coil drive transistor of the conventional switching regulator.

In FIG. 11, the detected voltage of a power output voltage VOUT on the secondary side which is detected at a division ratio of resistors R2, R3 is input to an FB terminal of a driver IC 101 for a DC/DC converter. Also, the power output voltage VOUT is input to a VDD terminal as the supply voltage for the driver IC 101. Furthermore, a pulse signal which controls the switching operation of the coil drive transistor is output from an OUT terminal. FIG. 12 shows the pulse signal output from the OUT terminal.

The driver IC 101 controls an "H" level period (Ton) and "L" level period (Toff) of the pulse signal output from the OUT terminal based on the difference between the detected voltage input to the FB terminal and an internal reference voltage and performs negative feedback operation so that the voltage value obtained by dividing the power output voltage VOUT using resistors R2, R3 converges toward the internal reference voltage. Furthermore, the driver IC 101 sets a pulse peak value Vm of the pulse signal output from the OUT terminal to substantially the same potential as the VDD terminal voltage and outputs it.

A PWM pulse control section 102 converts the pulse signal output from the OUT terminal of the driver IC 101 to a current through a resistor R1, outputs it to the base terminal of the bipolar transistor TrA and directly outputs the pulse signal to the gate terminal of the field effect transistor TrB. The bipolar transistor TrA and field effect transistor TrB are ON for a period during which the pulse signal is at an "H" level (Ton) and OFF for a period during which the pulse signal is at an "L" level (Toff).

Hereinafter, the operation of this conventional switching regulator will be explained.

First, upon start-up of the supply voltage source BT, if a forward diode voltage of a Schottky barrier diode D1 is assumed to be 0.2 (V), a voltage of:

$$VIN-0.2$$

is applied to the VDD terminal of the driver IC 101, where VIN is a power input voltage (battery voltage).

Therefore, if it is assumed that the base-emitter voltage of the bipolar transistor TrA is VBE and the resistance value of resistor R1 is R1, the base current Ib input to the base terminal of the bipolar transistor TrA upon start-up is, $$Ib \approx (VIN-0.2-VBE)/R1$$

and the bipolar transistor TrA starts the switching operation.

Furthermore, if a threshold voltage of the field effect transistor TrB is assumed to be Vth, when the power input voltage (battery voltage) VIN upon start-up has a relationship:

$$VIN-0.2 < Vth$$

the relationship between the pulse peak value Vm of the pulse signal output from the OUT terminal of the driver IC 101 and the threshold voltage Vth is also similar, and therefore the field effect transistor TrB whose threshold voltage Vth is large cannot start the switching operation immediately after start-up.

After start-up, when the power output voltage VOUT is stepped up by the switching operation of the bipolar transistor TrA so as to have a relationship:

$$VOUT \geq Vth$$

the relationship between the pulse peak value Vm of the pulse signal output from the OUT terminal of the driver IC 101 and the threshold voltage is also similar, and therefore the field effect transistor TrB starts the switching operation.

As shown above, the conventional switching regulator provided with the bipolar transistor and field effect transistor connected in parallel as coil drive transistors steps up the power output voltage VOUT on the secondary side to a predetermined voltage (threshold voltage of the field effect transistor) through the switching operation of the bipolar transistor upon start-up first, and then steps up the power output voltage VOUT on the secondary side to a set voltage mainly through the switching operation of the field effect transistor.

Figure 4:
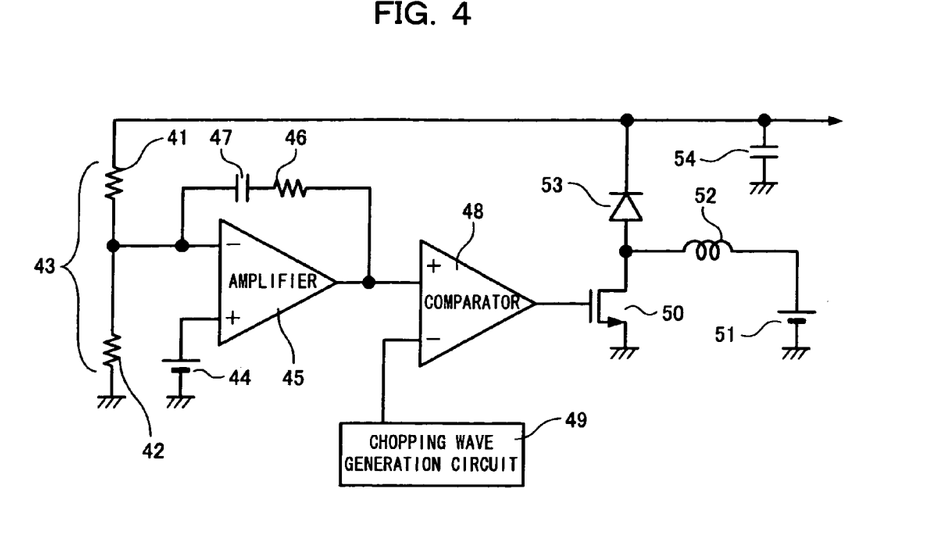
FIG. 4 shows the construction of a general voltage step up DC/DC converter.

Furthermore, though the internal construction of the driver IC 101 for the DC/DC converter is not known in FIG. 11, the construction of a general voltage step up DC/DC converter is as shown in FIG. 4. With the general voltage step up DC/DC converter, the power output voltage VOUT is controlled so that the voltage value obtained by dividing the power output voltage VOUT using resistors 41, 42 converges to an internal reference voltage Va of the reference voltage source 44.

However, according to the construction of the conventional power apparatus, even when the apparatus is used for electrical equipment having a standby mode and normal operating mode, the power input voltage is converted to a set voltage by the same circuit in the standby mode and normal operating mode. That is, the same set voltage is supplied to a load with the same current supply performance. For this reason, even when a device (e.g., microcomputer) whose current consumption in a standby mode is smaller than in a normal operating mode is used as a load on the secondary side, the construction of the conventional switching regulator cannot reduce current consumption of the switching regulator itself in the standby mode, unable to reduce current consumption (outflow current) from the supply voltage source (battery) in the standby mode.

Furthermore, when a device requiring an accurate and constant voltage (e.g., microcomputer) as the power supply input in the normal operating mode is used as the load on the secondary side and a battery whose voltage drops with time is used as the supply voltage source on the primary side, the following problem occurs with the conventional switching regulator made up of only a voltage step up DC/DC converter. That is, for the conventional switching regulator, when the battery voltage is higher than the voltage obtained by adding the forward diode voltage of the rectification diode D1 to the set voltage, the power output voltage to be supplied to the load is raised to a voltage obtained by subtracting the forward diode voltage of the diode D1 from the battery voltage. When the battery voltage decreases with time, the power output voltage decreases accordingly and it is not possible to supply a constant voltage to the device in the normal operating mode.

DISCLOSURE OF THE INVENTION

In view of the above-described problems, it is an object of the present invention to provide a switching regulator capable of reducing current consumption of the switching regulator itself in a standby mode, reducing current consumption (outflow current) from the supply voltage source in the standby mode and supplying a constant voltage unaffected by the voltage of the supply voltage source to a load in a normal operating mode.

In order to attain this object, the switching regulator of the present invention adopts a construction such that a voltage step up DC/DC converter supplies to the load a power output voltage equal to or higher than a set voltage (second set voltage) in a standby mode which is lower than a set voltage (first set voltage) in a normal operating mode, while a step up/step down DC/DC converter supplies to the load a set voltage (first set voltage) in the normal operating mode.

Furthermore, since the conventional switching regulator uses the power output voltage on the secondary side as the circuit power of the voltage step up DC/DC converter, when a battery is used as the supply voltage source on the primary side, the supply voltage of the voltage step up DC/DC converter at the time of setting the battery becomes, as described above, a voltage which is lower than the battery voltage by the diode voltage in the direction of easy flow of the rectification diode. Therefore, there is a problem that the lower limit value of the battery voltage necessary upon start-up (at the time of setting the battery) increases by an amount corresponding to the diode voltage in the direction of easy flow.

Therefore, in view of the above-described problems, it is an object of the present invention to provide a switching regulator capable of operating even when the power input voltage is upon start-up. To attain this object, the switching regulator of the present invention adopts a construction directly using the power input voltage from the supply voltage source as the supply voltage of the voltage step up DC/DC converter.

Furthermore, as shown in FIG. 4, since a general voltage step up DC/DC converter is provided with an amplifier (error amplifier), current consumption is produced at this error amplifier even in the standby mode in the conventional switching regulator.

Therefore, in view of the above-described problems, it is an object of the present invention to provide a switching regulator capable of reducing current consumption produced at the error amplifier in the standby mode and reducing current consumption (outflow current) from the supply voltage source in the standby mode. To attain this object, the switching regulator of the present invention adopts a construction such that the voltage step up DC/DC converter which operates in the standby mode includes no amplifier (error amplifier) unlike a general voltage step up DC/DC converter.

DESCRIPTION OF THE EMBODIMENTS

Hereinafter, embodiments of a switching regulator according to the present invention will be explained with reference to the attached drawings. The present switching regulator is used for electric equipment that uses a battery as a supply voltage source on the primary side.

Figure 1:
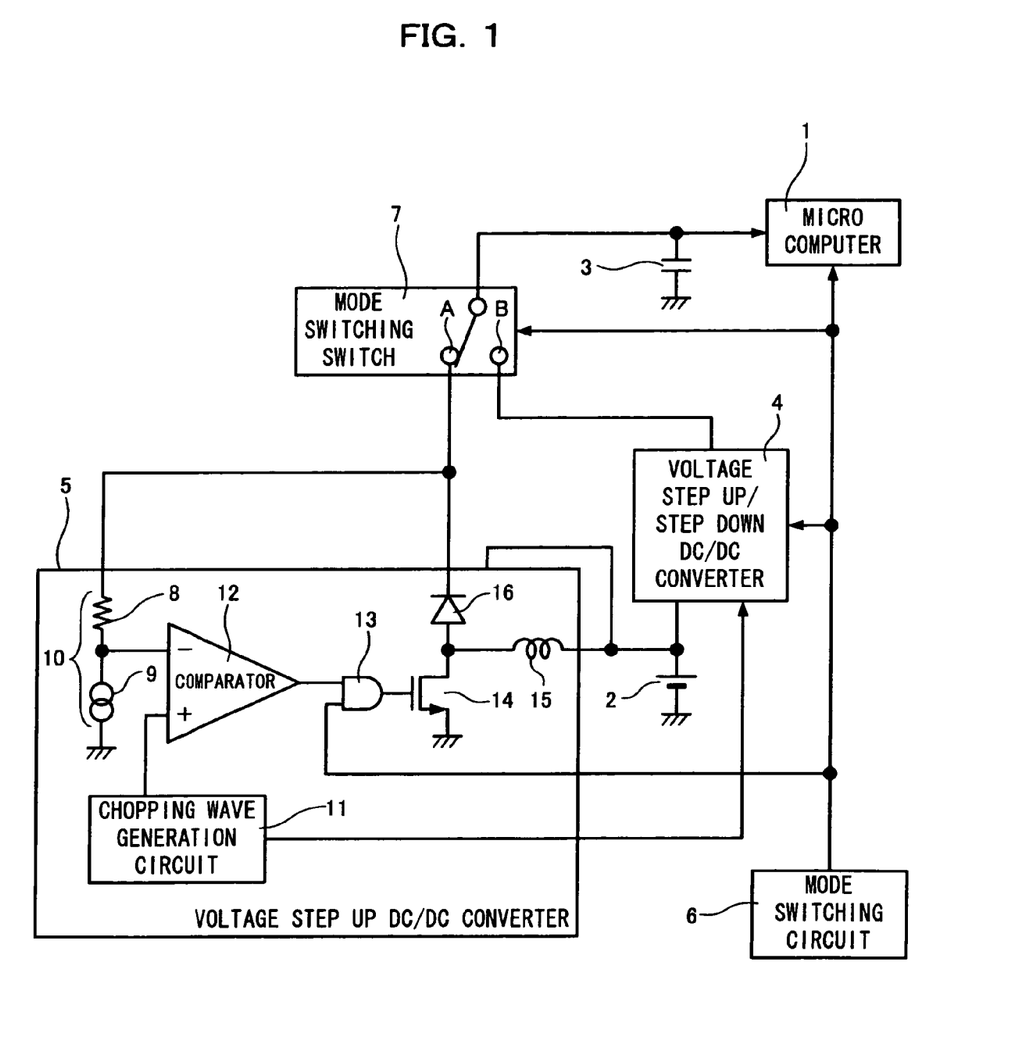
FIG. 1 illustrates a schematic construction of a switching regulator according to an embodiment of the present invention.

FIG. 1 shows the schematic construction of the switching regulator according to this embodiment.

In FIG. 1, a microcomputer 1 is a load connected to a secondary side output terminal (not shown) of the present switching regulator and is incorporated in the electric equipment which uses the present switching regulator.

A supply voltage source 2 on the primary side is connected to an input terminal on the primary side (not shown) of the switching regulator and it is a battery in this embodiment.

Furthermore, as the electric equipment which uses the switching regulator, this embodiment assumes a specification generally having an operating mode and a standby mode, setting the standby mode when a battery is set and left in that condition, stopping most of circuits of the microcomputer 1 and operating some remaining circuits.

The specification of the power input from the switching regulator of the microcomputer 1 will be explained here. In the standby mode, since current consumption in the microcomputer 1 is small, the required current supply performance can be small (for example, 50 µA) and a voltage equal to or higher than a second set voltage which is lower than a first set voltage can be set in the normal operating mode (for example, 2 V). On the other hand, the current consumption at the microcomputer 1 is large in the normal operating mode, and so the current supply performance needs to be large (for example, a maximum of 100 mA), and a constant voltage (first set voltage) which is not influenced by any voltage variation of the supply voltage source (battery) 2 should be applied (for example, 2.5 V).

An output smoothing capacitor 3 is connected to a space between the secondary side output terminal of the switching regulator and GND (grounding), it smoothes the output from the step up/step down DC/DC converter 4 or voltage step up DC/DC converter 5 and supplies the average power to the load (microcomputer 1).

A mode switching circuit 6 outputs a mode switching signal for switching between the standby mode and normal operating mode. Here, the mode switching signal is a binary signal for changing the potential depending on whether the electric equipment (microcomputer 1) is in the standby mode or the normal operating mode, becomes "H" level in the standby mode and "L" level in the normal operating mode. The mode switching circuit is incorporated in the electric equipment, and diverts the circuit which sets the microcomputer 1 to the standby mode or the normal operating mode.

The step up/step down DC/DC converter 4 converts the power output voltage obtained by converting a power input voltage VIN from the supply voltage source 2 to the first set voltage in the normal operating mode and supplies it to the microcomputer 1.

When the power output voltage VOUT which is supplied to the microcomputer 1 in the standby mode is equal to or lower than the second set voltage which is lower than the first set voltage, the voltage step up DC/DC converter 5 outputs the power output voltage VOUT which is the power input voltage VIN converted to the second set voltage and supplies it to the microcomputer 1 with current supply performance smaller than that of the step up/step down DC/DC converter 4. Furthermore, when the power output voltage VOUT exceeds the second set voltage, the voltage step up DC/DC converter 5 applies the power input voltage VIN to the output smoothing capacitor 3 without converting it to the second set voltage. Furthermore, the voltage step up DC/DC converter 5 directly uses the power input voltage VIN from the supply voltage source 2 as its own supply voltage.

The mode switching switch 7 has contact A and contact B, and according to the mode switching signal from the mode switching circuit 6, it connects the contact A and supplies the power output voltage of the voltage step up DC/DC converter 5 to the microcomputer 1 in the standby mode, and connects the contact B and supplies the power output voltage of the step up/step down DC/DC converter 4 to the microcomputer 1 in the normal operating mode.

With the above-described construction, the switching regulator supplies power to the microcomputer 1 (load) using the voltage step up DC/DC converter with small current consumption in the standby mode, and can thereby reduce current consumption of the switching regulator itself in the standby mode.

That is, as described above, the conventional switching regulator supplies the same set voltage to the load with the same current supply performance in any one of the standby mode and the normal operating mode. Therefore, even when power is supplied to the load whose current consumption is smaller in the standby mode than in the normal operating mode, the conventional switching regulator can neither reduce current consumption of the switching regulator itself in the standby mode nor reduce current consumption (outflow current) from the supply voltage source in the standby mode. On the contrary, the present switching regulator can reduce current consumption of the switching regulator itself in the standby mode, and can thereby reduce current consumption from the supply voltage source in the standby mode. Therefore, it is possible to set small current consumption from the supply voltage source in the standby mode as the specification of the electric equipment including the switching regulator (for example, 200 μA when the supply voltage source is 2.4 V).

In this way, according to the present switching regulator, it is possible to reduce current consumption from the supply voltage source on the primary side in the standby mode and extend the battery life when a battery is used as the supply voltage source.

Moreover, when the load is a device in which a standby mode is set when a battery is set and left in that condition, the conventional switching regulator may have liquid leakage of the battery due to a drop of the battery voltage because there is much current consumption (outflow current) from the battery in the standby mode. On the contrary, the present switching regulator can reduce current consumption from the battery in the standby mode, thereby prevent liquid leakage of the battery and prevent the problem with the quality of the electric equipment due to liquid leakage of the battery.

Furthermore, the present switching regulator directly uses the power input voltage VIN from the supply voltage source 2 as the supply voltage of the voltage step up DC/DC converter 5, and can thereby operate even when the battery voltage is low when the battery is set (upon start-up).

That is, since the conventional switching regulator uses the power output voltage on the secondary side as the circuit power of the voltage step up DC/DC converter (see FIG. 11), when a battery is used as the supply voltage source on the primary side, it has a problem that the supply voltage of the voltage step up DC/DC converter drops by an amount corresponding to the forward diode voltage of the rectification diode (Schottky barrier diode) from the battery voltage. On the contrary, the present switching regulator directly uses a battery voltage as the supply voltage of the voltage step up DC/DC converter, and can thereby reduce a lower limit of the battery voltage which is necessary upon start-up compared to the conventional switching regulator.

Furthermore, the present switching regulator converts the power input voltage VIN to a set voltage (first set voltage) using the step up/step down DC/DC converter 4 in the normal operating mode, and can thereby supply the constant voltage not influenced by the voltage level of the supply voltage source (battery) 2 to the load.

That is, in the case of the conventional switching regulator made up of only a voltage step up DC/DC converter, when a battery whose voltage falls with time is used as the supply voltage source on the primary side, if the battery voltage is higher than the set voltage plus the forward diode voltage of the rectification diode, there is a problem that the power output voltage to be supplied to a load in the normal operating mode is raised to the voltage obtained by subtracting the forward diode voltage of the diode 16 from the battery voltage and the power output voltage falls with time. On the contrary, the present switching regulator uses a step up/step down DC/DC converter in the normal operating mode, and can thereby supply a constant voltage (first set voltage) with little variation to the load.

Next, the internal construction of the voltage step up DC/DC converter 5 will be explained.

In FIG. 1, a resistor 8 and a current source 9 constitute a detection circuit 10 which detects the power output voltage VOUT supplied to the microcomputer 1 and outputs the detected voltage. Furthermore, a chopping wave generation circuit 11 outputs a chopping wave signal having a predetermined peak value and a predetermined frequency.

A comparator 12 inputs the detected voltage of the detection circuit 10 to an inverted input terminal and inputs the chopping wave signal from the chopping wave generation circuit 11 to a non-inverted input terminal, compares the two and outputs a comparison result signal. More specifically, the comparator 12 outputs a pulse signal which becomes "H" level for a period during which the chopping wave signal exceeds a detected voltage and "L" level for a period during which the chopping wave signal falls below the detected voltage.

The comparison result signal of the comparator 12 is input to one end of an AND circuit 13 with 2 inputs. Furthermore, a mode switching signal from the mode switching circuit 6 is input to the other end of the AND circuit 13. The output of the AND circuit 13 is input to a gate terminal of a MOS transistor (Nch MOSFET) 14 which is a coil drive switching element. The output of this AND circuit 13 becomes the drive signal of the MOS transistor 14.

Because the mode switching signal becomes "H" level in the standby mode, the MOS transistor 14 performs a switching operation according to the comparison result signal from the comparator 11. In other words, the comparison result signal is the signal which controls the switching operation of the MOS transistor 14, turns ON the switching element for a period during which the chopping wave signal exceeds the detected voltage, and turns it OFF for a period during which the chopping wave signal falls below the detected voltage.

On the other hand, the drain terminal of the MOS transistor 14 is connected to a coil 15, to the other end of which the power input voltage VIN is applied, and also connected to a diode 16. Furthermore, the source terminal is grounded.

The diode 16 is connected to the output smoothing capacitor 3 in the standby mode through a mode switching switch 7.

The MOS transistor 14 drives the connection end of the coil 15 with the MOS transistor 14 through the switching operation and the diode 16 rectifies the output voltage from the connection end. In other words, when the MOS transistor 14 performs the switching operation, the energy from the supply voltage source 2 is stored in coil 15 for an ON period and the energy accumulated in the coil 15 is discharged to the output smoothing capacitor 3 through diode 16 for an OFF period.

The present switching regulator sets upper limits of the resistance value of the resistor 8, the current value of the current source 9 and the chopping wave signal so that current consumption of the switching regulator (voltage step up DC/DC converter 5) itself becomes small in the standby mode. More specifically, the present switching regulator sets the detected voltage (corresponding to the power output voltage VOUT) of the detection circuit 10 when there is little current consumption in the microcomputer 1 so as to substantially match the upper limit (corresponding to the second set voltage) of the chopping wave signal.

Next, the operation of the present switching regulator in two cases where there is little current consumption in the microcomputer 1 and where there is some current consumption (approximately 50 µA) when a mode switching signal (an "H" level signal) indicating a standby mode is output from the mode switching circuit 6 will be explained separately.

Figure 2:
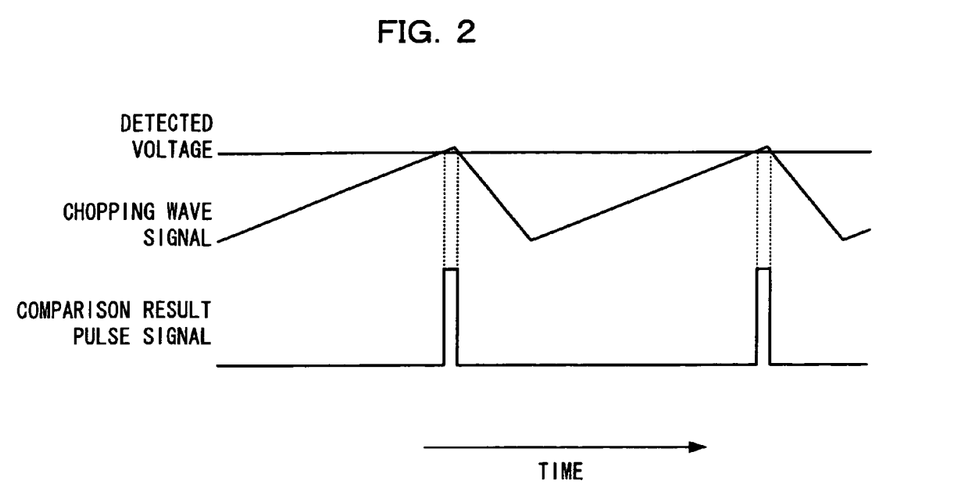
FIG. 2 is an operating waveform diagram illustrating operation in a standby mode of the switching regulator according to the same embodiment.

When there is little current consumption in the microcomputer 1, as described above, the detected voltage of the detection circuit 10 substantially matches the upper limit of the chopping wave signal from the chopping wave generation circuit 11 and the power output voltage VOUT becomes the second set voltage. Therefore, as shown in FIG. 2, the period during which the MOS transistor 14 is ON (period during which the comparison result signal from comparator 12 becomes "H" level) becomes extremely short and there is substantially no average current (load current) output to the load (microcomputer 1), either. Furthermore, if it is assumed that the upper limit of the chopping wave signal is V11max, the resistance value of resistor 8 is R8 and the current value of the current source 9 is I9, the power output voltage VOUT can be expressed by:

$$VOUT \approx V11max + (R8 \times I9).$$

Figure 3:
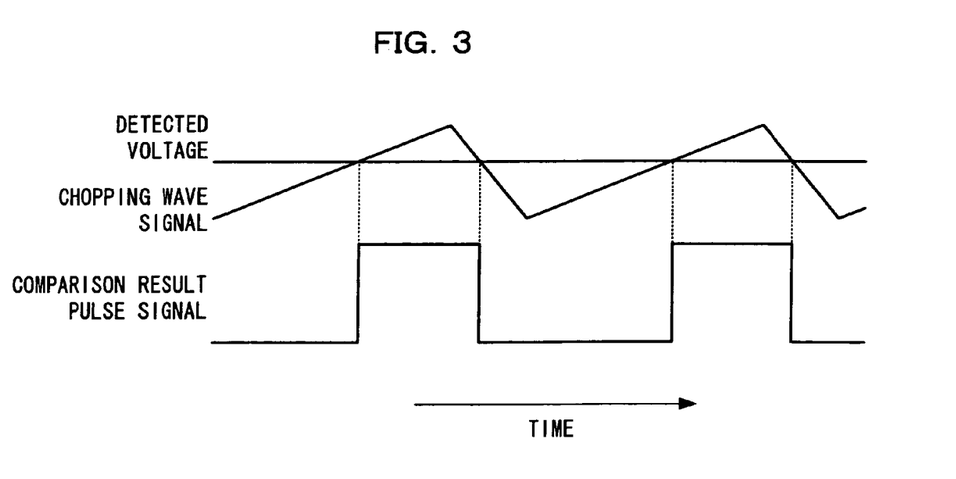
FIG. 3 is an operating waveform diagram illustrating operation in the standby mode of the switching regulator according to the same embodiment.

On the other hand, when there is some current consumption in the microcomputer 1 (approximately 50 µA), the voltage of the output smoothing capacitor 3 (power output voltage VOUT) decreases, and therefore the detected voltage of the detection circuit 10 also decreases. Therefore, as shown in FIG. 3, the period during which the MOS transistor 14 is ON becomes long and the average current (load current) output to the load also increases, and therefore the current supply performance increases compared to the case where there is little current consumption in the microcomputer 1.

The width of variation in the power output voltage VOUT, between a condition in which there is little current consumption in the microcomputer 1 and a condition in which there is some current consumption, that is, the width of variation in the detected voltage of the detection circuit 10 depends on the amplitude of the chopping wave signal. In other words, because the oscillating frequency of the chopping wave signal output from the chopping wave generation circuit 11 is constant, if the amplitude thereof is reduced, even a small variation in the detected voltage can extend the ON period of the MOS transistor 14 sufficiently and can increase the current supply performance. Therefore, the width of variation in the power output voltage VOUT also decreases. Thus, the present switching regulator sets the amplitude of the chopping wave signal output from the chopping wave generation circuit 11 to a small value to reduce the influence of the current consumption in the microcomputer 1 on the power output voltage VOUT. For example, if it is assumed that the upper limit of the chopping wave signal is 1.1 V and the lower limit value is 0.9 V, the width of variation in the detected voltage becomes approximately a maximum of 0.2 V and it is possible to decrease the width of variation in the power output voltage VOUT.

Furthermore, if it is assumed that the second set voltage in the standby mode is V2, the voltage (forward diode voltage) when the diode 16 is turned ON is VF, when the voltage VIN of the supply voltage source 2 has a relationship:

$$VIN > V2 + VF$$

the power output voltage VOUT maintains a relationship:

$$VOUT \approx VIN - VF$$

and becomes bigger than the second set voltage V2, and the switching operation of the MOS transistor 14 remains stopped. However, as mentioned above, this is no problem because the specification of the power input of the microcomputer 1 in the standby mode is met if a voltage equal to or higher than the second set voltage V2 is applied. Next, the difference between the voltage step up DC/DC converter 5 and general voltage step up DC/DC converter will be explained. FIG. 4 shows the construction of the general voltage step up DC/DC converter.

In FIG. 4, the resistors 41, 42 constitute a detection circuit 43 which outputs a detected voltage obtained by dividing the power output voltage VOUT. Furthermore, a reference voltage source 44 outputs an internal reference voltage.

The internal reference voltage of the reference voltage source 44 is input to the non-inverted input terminal of an amplifier (error amplifier) 45 and the detected voltage of the detection circuit 43 is input to the inverted input terminal. Furthermore, this amplifier 45 constitutes a negative feedback type differential amplifier whose output is fed back to the inverted input terminal through a resistor 46 and a capacitor 47. In this construction, the amplifier 45 outputs an error amplified signal obtained by amplifying the difference between the internal reference voltage and the detected voltage at a predetermined amplification factor.

A comparator 48 inputs the error amplified signal from the amplifier 45 to the non-inverted input terminal and inputs a chopping wave from a chopping wave generation circuit 49 to the inverted input terminal, compares the two and outputs a comparison result signal. More specifically, the comparator 48, outputs a pulse signal which becomes "H" level for a period during which the voltage of the error amplified signal exceeds the chopping wave signal and "L" level for a period during which the voltage of the error amplified signal falls below the chopping wave signal. This comparison result signal is input to the gate terminal of a MOS transistor (Nch MOSFET) 50 which is a coil drive switching element. The MOS transistor 50 performs a switching operation according to the comparison result signal from the comparator 48, In other words, the comparison result signal is a signal for driving/controlling the switching operation of the MOS transistor 50 and the comparison result signal here turns ON the switching element for a period during which the voltage of the error amplified signal exceeds the chopping wave signal and turns it OFF for a period during which the voltage of the error amplified signal falls below the chopping wave signal.

On the other hand, the drain terminal of the MOS transistor 50 is connected to a coil 52, to the other end of which a power input voltage VIN is applied, and is also connected to a diode 53. Furthermore, the source terminal is grounded.

The diode 53 is connected to an output smoothing capacitor 54.

The MOS transistor 50 drives the connection end of the coil 52 with the MOS transistor 50 through the switching operation and the diode 53 rectifies the output from the connection end. In other words, when the MOS transistor 50 performs a switching operation, the energy from a supply voltage source 51 is stored in the coil 52 during an ON period, and the energy accumulated in the coil 52 is discharged to the output smoothing capacitor 54 through the diode 53 during an OFF period.

Figure 5:
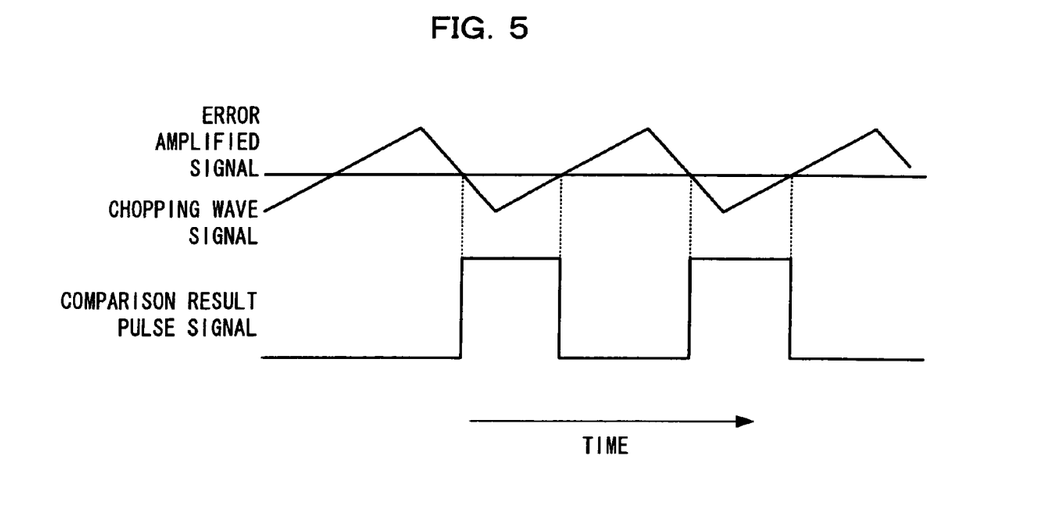
FIG. 5 is an operating waveform diagram illustrating operation of a general voltage step up DC/DC converter.

In this way, the general voltage step up DC/DC converter detects the power output voltage VOUT fed back from the secondary side using the detection circuit 43, compares the error amplified signal obtained by amplifying the difference between the detected voltage of the detection circuit 43 and the internal reference voltage of the reference voltage source 44 with the chopping wave signal from the chopping wave generation circuit 49 and outputs the comparison result signal as shown in FIG. 5. That is, the general voltage step up DC/DC converter extends the period of the "H" level of the comparison result signal, that is, the ON period of the MOS transistor 50 as the power output voltage VOUT decreases and the error amplified signal rises, and can thereby cause the power output voltage VOUT to converge to a set voltage.

More specifically, when it is assumed that the voltage of the reference voltage source 44 is Va and resistance values of the resistors 41, 42 are R41, R42, the power output voltage VOUT of this general voltage step up DC/DC converter converges to the value determined by the following expression:

$$VOUT \approx Va \times \{(R41+R42)/R42\}.$$

That is, as the power output voltage VOUT decreases, the voltage level of the error amplified signal increases, the period of the "H" level of the comparison result signal extends, the period during which the MOS transistor 50 is ON extends and the power output voltage VOUT tends to rise. Likewise, as the power output voltage VOUT increases, the level of the error amplified signal decreases, the period of "H" level of the comparison result signal decreases, the period during which the MOS transistor 50 is ON decreases and the power output voltage VOUT tends to drop. Through the above-described operation, the power output voltage VOUT converges to the value determined by the above-described expression.

As described above, the general voltage step up DC/DC converter shown in FIG. 4 has been explained, but the construction of the voltage step up DC/DC converter 5 of the present switching regulator includes no amplifier (error amplifier) as shown in FIG. 1 unlike the general voltage step up DC/DC converter. Therefore, according to the present switching regulator, current consumption produced at the error amplifier in the standby mode can be reduced, and the battery life can be thereby extended, and moreover the problem with the quality of the electric equipment due to liquid leakage of a battery can also be solved when the battery is used as the supply voltage source on the primary side.

Furthermore, as described above, the conventional switching regulator uses the power output voltage VOUT as the circuit power of the voltage step up DC/DC converter, and therefore when a battery is used as the supply voltage source on the primary side, a Schottky barrier diode (forward diode voltage; approximately 0.2 V) with a small forward diode voltage is used as the rectification diode so as to be able to start at a lower battery voltage. On the contrary, because the present switching regulator directly uses the battery voltage, it is possible to use a low-cost silicon diode (forward diode voltage; approximately 0.6 to 0.7 V). Moreover, because no Schottky barrier diode is used as the rectification diode, when a voltage step up DC/DC converter is constructed using a semiconductor integrated circuit, it is possible to allow the semiconductor integrated circuit to incorporate the rectification diode.

Furthermore, the AND circuit 13 can stop the switching operation of the coil drive MOS transistor 14 in an OFF state in the normal operating mode. That is, the mode switching signal becomes "L" level in the normal operating mode and an "L" level signal is always input to the gate terminal of the MOS transistor 14, and therefore the switching operation of MOS transistor 14 stops in the OFF state. Therefore, the present switching regulator can prevent malfunction that the MOS transistor 14 is turned ON in the normal operating mode, reduce current consumption from the supply voltage source 2 and avoid the adverse influence of the switching operation of the MOS transistor 14 on other circuits.

In the standby mode, when the power input voltage VIN exceeds the second set voltage plus the forward diode voltage of the diode 16, the present switching regulator is designed to apply the power input voltage VIN to the output smoothing capacitor 3 through the diode 16 incorporated in the voltage step up DC/DC converter 5. Therefore, when the power input voltage VIN exceeds the second set voltage plus the forward diode voltage of the diode 16, the power output voltage VOUT to the microcomputer 1 is raised to the voltage dropped from the power input voltage VIN by an amount corresponding to the forward diode voltage of the diode 16. Therefore, attention should be given to the specification of the microcomputer 1 in the standby mode.

Next, the internal construction of the step up/step down DC/DC converter 4 will be explained using FIG. 6. However, FIG. 6 focuses on the internal construction of the step up/step down DC/DC converter 4 and only describes the construction to be used in the normal operating mode.

Figure 6:
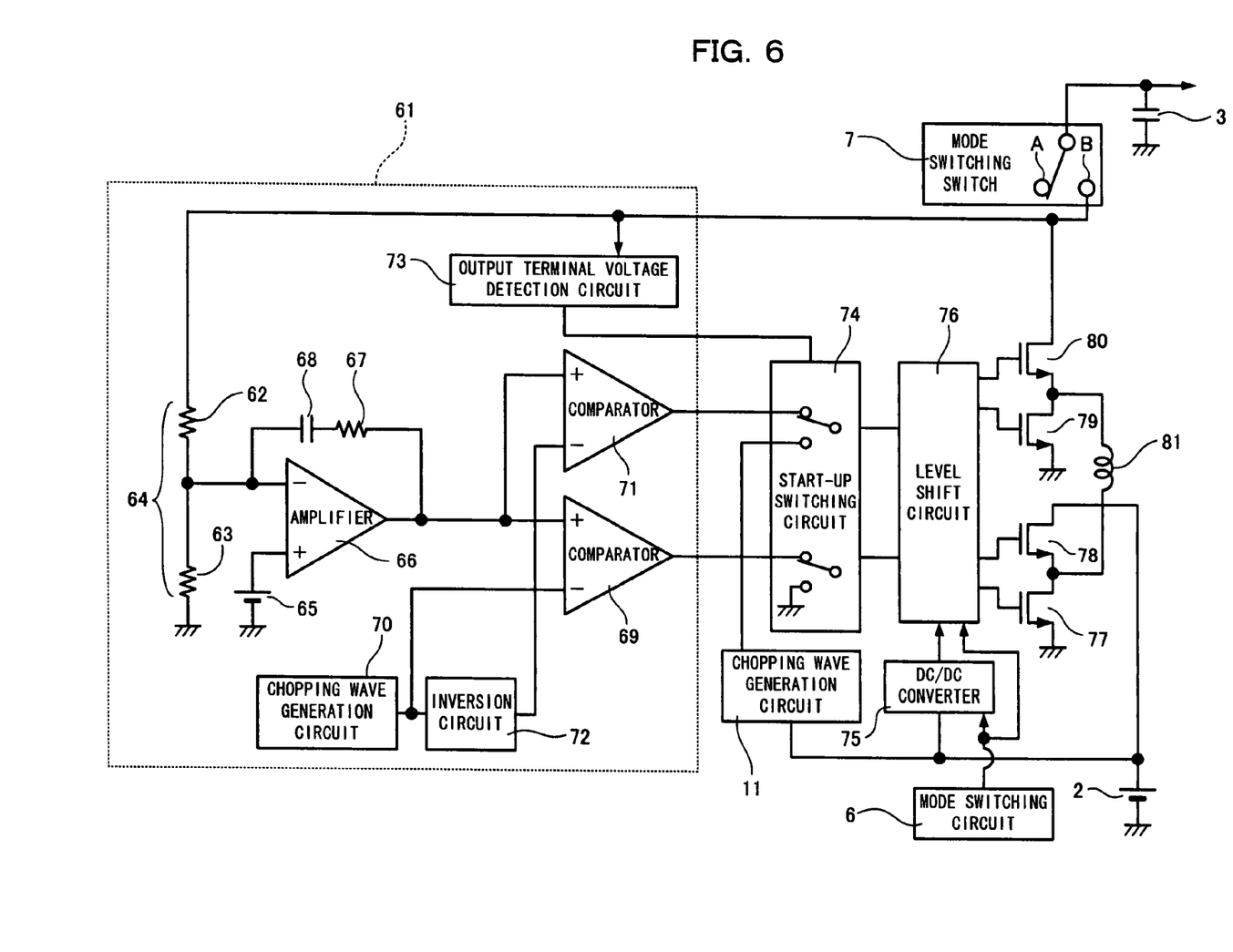
FIG. 6 shows the internal construction of a step up/step down DC/DC converter of the switching regulator according to the same embodiment.

In FIG. 6, the supply voltage source 2, output smoothing capacitor 3, mode switching circuit 6, mode switching switch 7 and chopping wave generation circuit 11 are made of the same members as those explained using FIG. 1. As described above, the mode switching switch 7 is connected to the contact B in the normal operating mode in which the step up/step down DC/DC converter 4 operates and supplies the power output voltage of the step up/step down DC/DC converter 4 to the microcomputer 1.

A pulse control section 61 controls the switching operations of switching elements 77 to 80 which convert the power input voltage VIN to the first set voltage. The output smoothing capacitor 3 smoothes the induced voltage of a coil 81 obtained through the switching operation and converts it to a DC voltage. The pulse control section 61 uses the power output voltage VOUT on the secondary side as the supply voltage, while the other circuits of the step up/step down DC/DC converter uses the voltage of the supply voltage source 2 as the direct supply voltage.

Resistors 62, 63 inside the pulse control section 61 constitute a detection circuit 64 which outputs a detected voltage obtained by dividing the power output voltage VOUT supplied to the load (microcomputer 1). Furthermore, a reference voltage source 65 outputs an internal reference voltage.

The internal reference voltage of the reference voltage source 65 is input to the non-inverted input terminal of an amplifier (error amplifier) 66 and the detected voltage of the detection circuit 64 is input to the inverted input terminal. Furthermore, this amplifier 66 constitutes a negative feedback type differential amplifier whose output is fed back to the inverted input terminal through a resistor 67 and a capacitor 68. In this construction, the amplifier 66 outputs an error amplified signal obtained by amplifying the difference between the internal reference voltage and the detected voltage at a predetermined amplification factor.

A 1st comparator 69 is for voltage step down, and inputs an error amplified signal from the amplifier 66 to the inverted input terminal and inputs a chopping wave signal from a chopping wave generation circuit 70 to the non-inverted input terminal, compares the two and outputs a comparison result signal for voltage step down. More specifically, the comparator 69 becomes "H" level for a period during which the chopping wave signal exceeds the voltage of the error amplified signal and outputs a pulse signal which becomes "L" level for a period during which the chopping wave signal falls below the voltage of the error amplified signal. This comparison result signal for voltage step down becomes a signal which controls a switching operation of the switching element for voltage step down.

On the other hand, a 2nd comparator 71 is for voltage step up, inputs the error amplified signal from the amplifier 66 to the non-inverted input terminal, inputs a signal obtained by inverting the chopping wave signal from the chopping wave generation circuit 70 using an inversion circuit 72 (inverted chopping wave signal) to the inverted input terminal, compares the two and outputs a comparison result signal for voltage step up. More specifically, the comparator 71 outputs a pulse signal which becomes "H" level for a period during which the voltage of the error amplified signal exceeds the inverted chopping wave signal and "L" level for a period during which the voltage of the error amplified signal falls below the inverted chopping wave signal. This comparison result signal for voltage step up becomes a signal which controls a switching operation of the switching element for voltage step up.

Furthermore, an output terminal voltage detection circuit 73 detects the power output voltage VOUT on the secondary side of the voltage step up/step down DC/DC converter and outputs a circuit operation switching signal which switches the circuit operation according to the voltage. That is, the output terminal voltage detection circuit 73 outputs a signal for switchover to the circuit operation for start-up when the power output voltage VOUT is equal to or lower than a predetermined voltage (for example, a hysteresis of approximately 0.1 V is normally provided when the power output voltage VOUT is equal to or lower than 1.8 V). On the other hand, when the predetermined voltage is exceeded, it outputs a signal for switchover to normal circuit operation which converts the power input voltage VIN to the first set voltage using the pulse control section 61.

When a start-up switching circuit 74 receives the signal for switchover to normal circuit operation from the output terminal voltage detection circuit 73, it outputs comparison result signals for voltage step up and voltage step down from the comparators 69, 71. On the other hand, when it receives the signal for switchover to the start-up circuit operation, it outputs a signal ("L" level signal) of the GND level instead of the output of the comparator 69 for voltage step down, and it outputs a pulse signal (pulse signal for start-up) from the chopping wave generation circuit 11 inside the voltage step up DC/DC converter 5 instead of the output of the comparator 71 for voltage step up. A chopping wave generation circuit 11 has the function of outputting, for example, a pulse signal which becomes "H" level for a period of falling of the chopping wave signal (e.g. duty 25%).

A DC/DC converter 75 for driving an output transistor supplies a stepped up power input voltage VIN to a level shift circuit 76 so that the 1st to 4th MOS transistors (Nch MOSFET) 77 to 80 which are coil drive switching elements can be driven with sufficiently low ON resistance.

The level shift circuit 76 converts the "H" level of the signal from the start-up switching circuit 74 to the voltage level output from the DC/DC converter 75. The level shift circuit 76 then outputs a comparison result signal for voltage step down or the signal of a GND level to the gate terminal of the 1st MOS transistor 77, outputs the inverted signal to the gate terminal of the 2nd MOS transistor 78, outputs a comparison result signal for voltage step up or a pulse signal for start-up to the gate terminal of the 3rd MOS transistor 79 and outputs the inverted signal to the gate terminal of the 4th MOS transistor 80.

The 1st and 2nd MOS transistors 77, 78 are switching elements for voltage step down, the source terminal of the 1st MOS transistor 77 is grounded, the power input voltage VIN is applied to the drain terminal of the 2nd MOS transistor 78, the drain terminal of the 1st MOS transistor 77 and the source terminal of the 2nd MOS transistor 78 are connected and one end of the coil 81 is connected to the connection point.

On the other hand, the 3rd and 4th MOS transistors 79, 80 are switching elements for voltage step up, the source terminal of the 3rd MOS transistor 79 is grounded and the drain terminal of the 4th MOS transistor 80 is connected to the output smoothing capacitor 3 through a mode switching switch 7, the drain terminal of the 3rd MOS transistor 79 and the source terminal of the 4th MOS transistor 80 are connected and the other end of the coil 81 is connected to the connection point.

In this way, this voltage step up/step down DC/DC converter has the construction of a synchronous rectification type DC/DC converter, converts the power input voltage VIN to the first set voltage using the MOS transistors 77, 78 in the voltage step down mode, converts the power input voltage VIN to the first set voltage using the MOS transistors 79, 80 in the voltage step up mode.

The supply voltage of the pulse control section 61 upon start-up is the voltage of the supply voltage source 2. However, when the voltage (battery voltage) of the battery which is the supply voltage source 2 upon start-up (when the battery is set) is lower than the voltage at which the pulse control section 61 can perform switching control sufficiently, the voltage step up/step down DC/DC converter forces the MOS transistors 79, 80 for voltage step up to perform the switching operation using the start-up pulse signal from the chopping wave generation circuit 11 and steps up the power output voltage VOUT to a voltage that the pulse control section 61 can perform switching control sufficiently.

Furthermore, a mode switching signal from the mode switching circuit 6 is input to the DC/DC converter 75 and level shift circuit 76, and when an "H" level signal is input from the mode switching circuit 6 in the standby mode, the DC/DC converter 75 stops operation, and at the same time, the level shift circuit 76 outputs an "L" level signal to the gate terminal of the MOS transistors 77 to 80 and stops the MOS transistors 77 to 80 in an OFF state. Therefore, this construction can prevent the malfunction of the MOS transistors 77 to 80 of turning ON in the standby mode, reduce current consumption from the supply voltage source 2 and prevent adverse influences of the switching operation of the MOS transistors 77 to 80 on other circuits.

Next, the operation of this voltage step up/step down DC/DC converter will be explained.

Upon start-up, the level shift circuit 76 outputs the "L" level signal (signal for stopping the switching element in an OFF state) to the 1st MOS transistor 77 and the 3rd MOS transistors 79, outputs an "H" level signal (signal for stopping the switching element in an ON state) which is the inverted signal to the 2nd MOS transistor 78 and 4th MOS transistor 80.

When the voltage of the set battery is low and the power output voltage VOUT upon start-up is equal to or lower than a predetermined voltage, the output terminal voltage detection circuit 73 outputs the signal for switchover to the start-up circuit operation. The start-up switching circuit 74 receives the signal and outputs a GND level signal ("L" level signal) and pulse signal for start-up from the chopping wave generation circuit 11.

Figure 7:
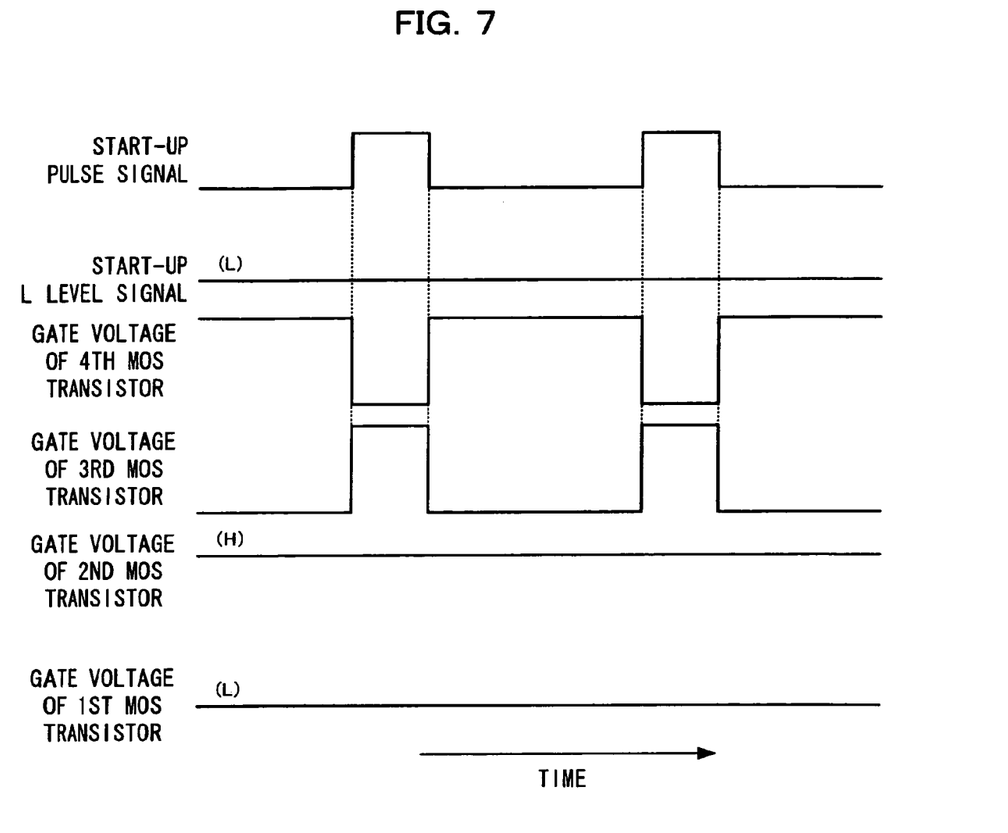
FIG. 7 is an operating waveform diagram illustrating operation of the switching regulator according to the same embodiment in the normal operating mode.

FIG. 7 shows an operating waveform diagram when the power output voltage VOUT upon start-up is equal to or lower than the predetermined voltage set by the output terminal voltage detection circuit 73. As shown in FIG. 7, a start-up pulse signal is output from the start-up switching circuit 74 and an "L" level signal for start-up (signal for stopping the switching element in an OFF state) is output instead of the comparison result signal for voltage step down.

The level shift circuit 76 receives the output from the DC/DC converter 75, outputs a start-up pulse signal whose level has been shifted (voltage conversion) to the 3rd MOS transistor 79, outputs the inverted pulse signal to the 4th MOS transistor 80, outputs an "L" level signal input instead of the comparison result signal for voltage step down to the 1st MOS transistor 77, outputs the "H" level signal which is an inverted signal (signal for stopping the switching element in an ON state) to the 2nd MOS transistor 78. As a result, the power output voltage VOUT of the voltage step up/step down DC/DC converter is stepped up through switching control of the start-up pulse signal.

In order to eliminate a period during which the 1st and 2nd MOS transistors 77, 78 are turned ON at the same time and eliminate a period during which the 3rd and 4th MOS transistors 79, 80 are turned ON at the same time, a period is generally provided (approximately 50 ns in the case of, for example, 100 kHz signal) called "dead time" for preventing penetration during which both gate voltages become "L" level when thee pulse polarity is changed.

When the power output voltage VOUT rises to a predetermined voltage (e.g., 1.8 V) set by the output terminal voltage detection circuit 73, the power output voltage VOUT converges to the first set voltage through the operation which will be explained below. At this time, since the power output voltage VOUT has risen to the predetermined voltage (e.g., 1.8 V) set by the output terminal voltage detection circuit 73, the pulse control section 61 which uses the power output voltage VOUT as the supply voltage can perform switching control sufficiently.

When the power output voltage VOUT rises to the predetermined voltage set by the output terminal voltage detection circuit 73, the output terminal voltage detection circuit 73 outputs the signal for switchover to normal circuit operation. The start-up switching circuit 74 receives the signal and outputs a comparison result signal from the comparator 69 for voltage step down and a comparison result signal from the comparator 71 for voltage step up.

The voltage step up/step down DC/DC converter determines whether to operate as a voltage step up DC/DC converter or voltage step down DC/DC converter depending on the voltage relationship between the first set voltage and power output voltage VOUT.

Figure 8:
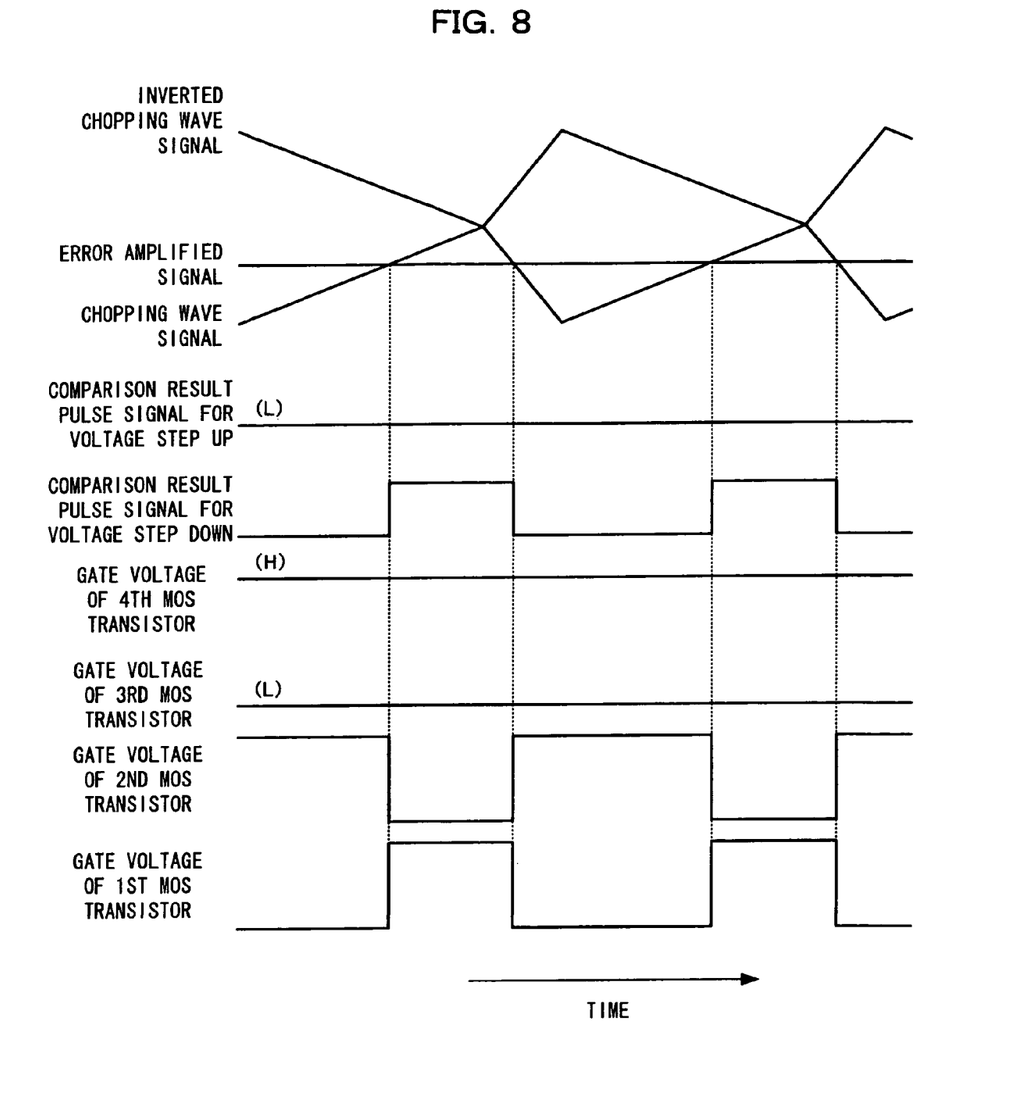
FIG. 8 is an operating waveform diagram illustrating operation of the switching regulator according to the same embodiment in the normal operating mode.

FIG. 8 shows an operating waveform diagram in the voltage step down mode when the power output voltage VOUT is higher than the first set voltage. As shown in FIG. 8, as the power output voltage VOUT increases, the output of the amplifier 66 (error amplified signal) decreases and the "H" level period of the comparison result signal for voltage step down corresponding to a comparison between an error amplified signal and a chopping wave signal from the chopping wave generation circuit 70 increases. The level of this comparison result signal for voltage step down is shifted and output to the 1st MOS transistor 77 and the inverted signal is output to the 2nd MOS transistor 78. On the other hand, the comparison result signal for voltage step up corresponding to a comparison between an error amplified signal and an inverted chopping wave signal from the inversion circuit 72 is fixed to "L" level, and therefore the signal fixed to the "L" level is output to the 3rd MOS transistor 79 and the inverted signal (signal fixed to the "H" level) is output to the 4th MOS transistor 80. Therefore, in this case, the voltage step up/step down DC/DC converter operates as the voltage step down DC/DC converter.

As a result, if it is assumed that the resistance values of the resistors 62, 63 are R62, R63 and the internal reference voltage of the reference voltage source 65 is Va, the power output voltage VOUT converges to a value (first set voltage) determined by the expression below:

$$VOUT \approx Va \times \{(R62+R63)/R63\}.$$

Figure 9:
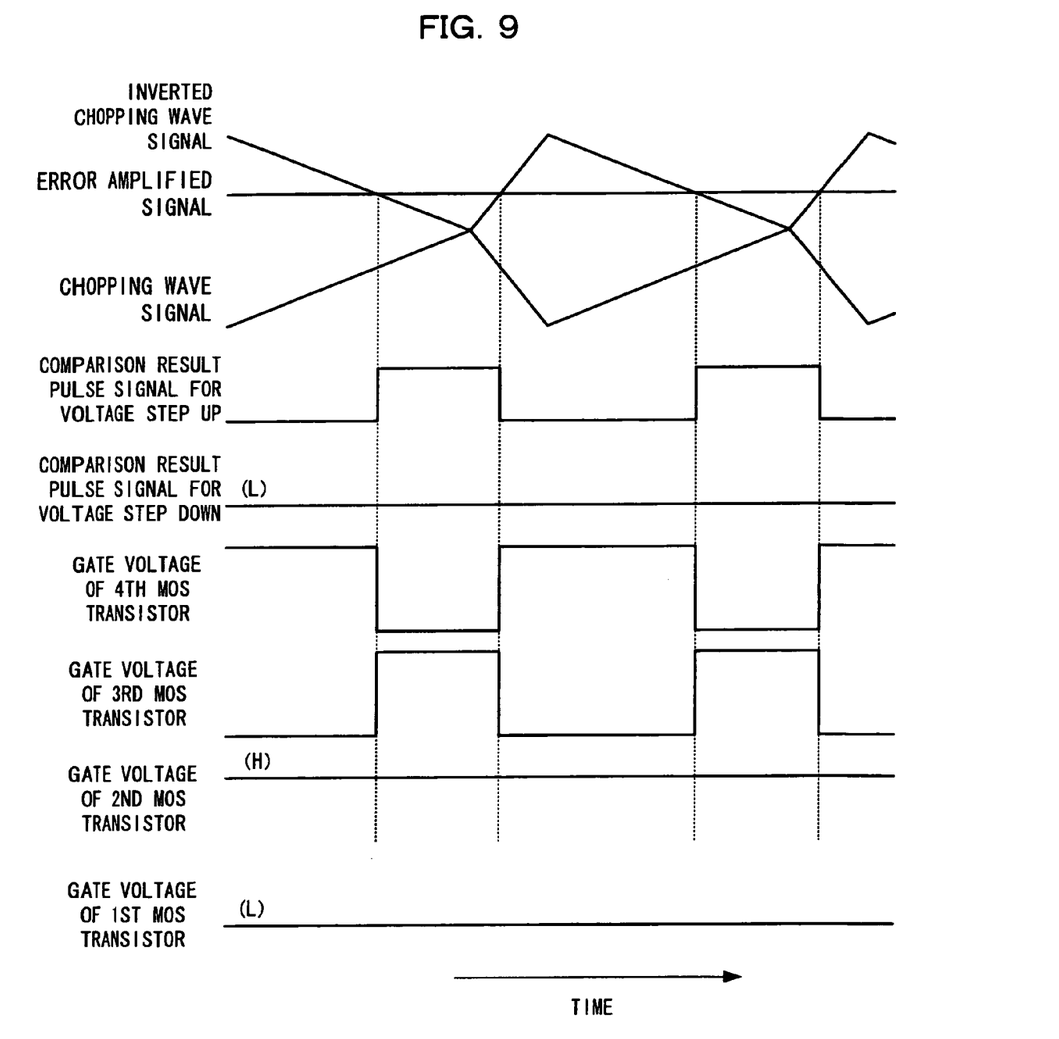
FIG. 9 is an operating waveform diagram illustrating operation of the switching regulator according to the same embodiment in the normal operating mode.

FIG. 9 shows an operating waveform diagram in the voltage step up mode when the power output voltage VOUT on the secondary side is lower than the first set voltage. As shown in FIG. 9, as the power output voltage VOUT decreases, the output (error amplified signal) of the amplifier 66 rises and the "H" level period of the comparison result signal for voltage step up corresponding to a comparison between an error amplified signal and inverted chopping wave signal from the inversion circuit 72 increases. The level of this comparison result signal for voltage step up is shifted and output to the 3rd MOS transistor 79 and the inverted signal is output to the 4th MOS transistor 80. On the other hand, the comparison result signal for voltage step down corresponding to a comparison between the error amplified signal and the chopping wave signal from the chopping wave generation circuit 70 is fixed to the "L" level, and therefore the signal fixed to the "L" level is output to the 1st MOS transistor 77 and the inverted signal (signal fixed to the "H" level) is output to the 2nd MOS transistor 78. Therefore, in this case, the voltage step up/step down DC/DC converter operates as a voltage step up DC/DC converter.

As a result, if it is assumed that the resistance values of the resistors 62, 63 are R62, R63, the internal reference voltage of the reference voltage source 65 is Va, the power output voltage VOUT converges to a voltage (first set voltage) determined by the following expression:

$$VOUT \approx Va \times \{(R62+R63)/R63\}.$$

In this way, according to the present switching regulator, the power output voltage VOUT converges to the same value in the voltage step down mode and the voltage step up mode, and therefore it is possible to supply a constant voltage which is not influenced by the voltage of the supply voltage source to the load. The voltage step up mode and voltage step down mode have been explained, but it is also possible to provide a period during which both modes operate simultaneously so that modes can be switched smoothly.

As described above, in the normal operating mode according to the present switching regulator, even if the power input voltage VIN changes (for example, range from 3.3 V to 1.5 V) with time as in the case where the supply voltage source on the primary side is a battery, it is possible to generate a constant voltage (e.g., 2.5 V) as the power output voltage VOUT through the operation of the voltage step up/step down DC/DC converter.

According to the switching regulator, even when the voltage of the supply voltage source on the primary side is low, it is possible to step up the power output voltage VOUT up to a voltage at which the pulse control section 61 can perform switching control with the circuit which uses the supply voltage source on the primary side as the direct supply voltage and realize a long battery life until the pulse control section 61 which uses the power output voltage VOUT as a supply voltage starts a switching control. Furthermore, even when a normal operating mode is set upon start-up and the device is used for electric equipment which constitutes a heavy load, the present switching regulator can start up without any problem. Moreover, when a long "H" level period of the start-up pulse signal generated from the chopping wave generation circuit inside the voltage step up DC/DC converter is set (when the ON period of the 3rd MOS transistor is extended and a long OFF period of the 4th MOS transistor is set), startup can be realized more easily.

It is desirable to stop operation except the circuit shared with the voltage step up/step down DC/DC converter out of the inner circuits of the voltage step up DC/DC converter to reduce current consumption from the supply voltage source on the primary side in the normal operating mode.

Figure 10:
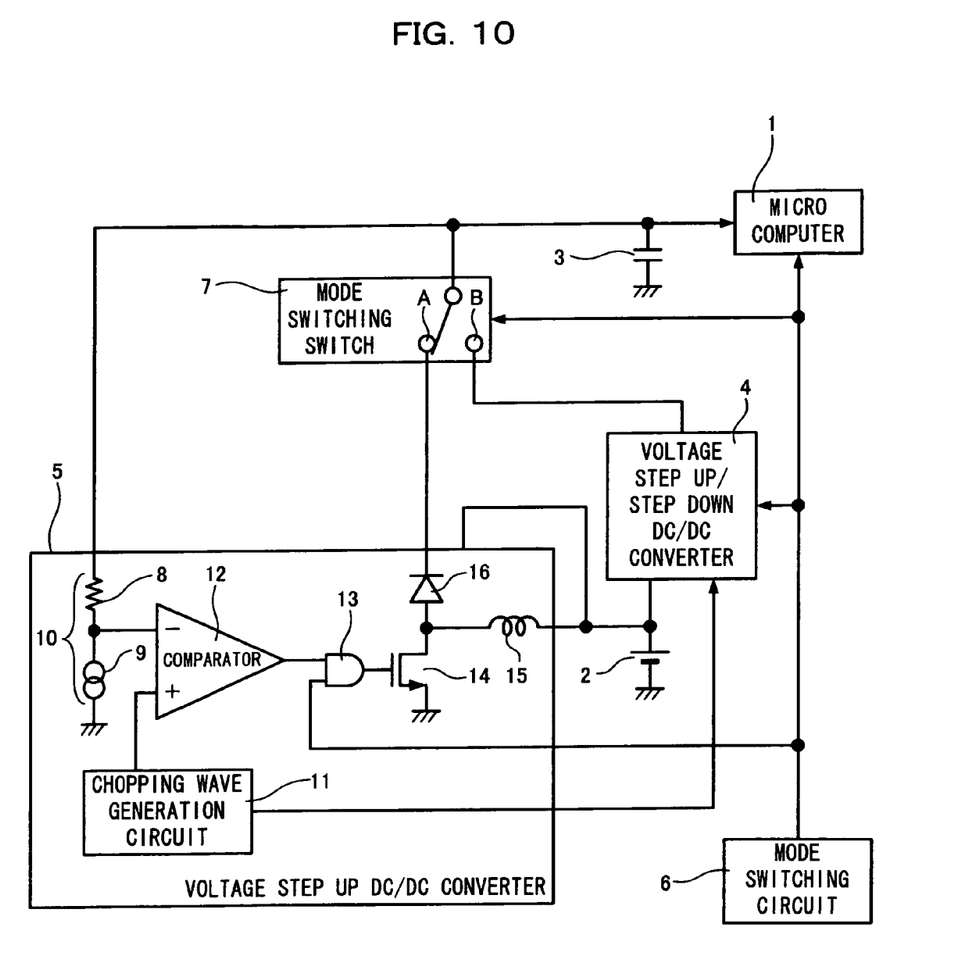
FIG. 10 shows the schematic construction of the switching regulator according to another embodiment of the present invention.

FIG. 10 shows the schematic construction of the switching regulator according to another embodiment. With the switching regulator shown in FIG. 1, feedback is provided with the connection point between the mode switching switch 7 and the diode 16 connected to the resistor 8, but it is also possible to provide feedback with a connection point between a mode switching switch 7 and an output smoothing capacitor 3 connected to the resistor 8 as shown in FIG. 10.

Furthermore, the switching regulator shown in FIG. 1 and FIG. 10 is provided with an output smoothing capacitor on the output side of the mode switching switch 7 but the output smoothing capacitor may also be provided on the input side of the mode switching switch 7. Furthermore, the output smoothing capacitor may also be provided inside the voltage step up DC/DC converter 5 and voltage step up/step down DC/DC converter 4 respectively. Moreover, in this case, output smoothing capacitors for voltage step up and voltage step down may be provided inside the voltage step up/step down DC/DC converter 4 respectively.

Furthermore, the microcomputer has been explained as an example of the load, but the load is not limited to this. The switching regulator according to the present invention uses a battery with a large voltage variation as the supply voltage source on the primary side and is only required to have small current consumption in the standby mode and have a voltage equal to or higher than a predetermined level applied and is suitable for use in electric equipment to which an accurate constant voltage should be applied as the power output voltage in the normal operating mode.

What is claimed is:

1. A switching regulator comprising:
   an input terminal connected to a supply voltage source;
   an output terminal connected to a load operable in a normal operating mode and a standby mode;
   a voltage step up/step down DC/DC converter for converting a power input voltage from said supply voltage source to a first set voltage corresponding to the normal operating mode, thereby generating a power output voltage at an output node of the voltage step up/step down DC/DC converter;
   a voltage step up DC/DC converter for converting the power input voltage from said supply voltage source to a second set voltage corresponding to the standby mode, when a power output voltage of the step up DC/DC converter is equal to or lower than the second set voltage which is lower than the first set voltage, and for allowing the power input voltage from the supply voltage source to pass without any conversion to the second set voltage when the power output voltage exceeds the second set voltage, thereby generating the power output voltage of the step up DC/DC converter at an output node of the step up DC/DC converter; and
   a mode switching switch for connecting said output terminal and the output node of said voltage step up/step down DC/DC converter in the normal operating mode, and connecting said output terminal and the output node of said voltage step up DC/DC converter in the standby mode.

2. The switching regulator according to claim 1, wherein said voltage step up DC/DC converter uses the power input voltage from said supply voltage source as a supply voltage of said voltage step up DC/DC converter.

3. The switching regulator according to claim 1, wherein said voltage step up DC/DC converter comprises:
   a detection circuit for detecting the power output voltage of said voltage step up DC/DC converter and generating a detected voltage;
   a chopping wave generation circuit for generating a chopping wave signal;
   a comparator for comparing the detected voltage and the chopping wave signal, and generating a comparison result signal;
   a switching element for performing a switching operation according to the comparison result signal;
   a coil for receiving the power input voltage from said supply voltage source at one end and the other end being driven by the switching operation of said switching element;
   a diode connected to the other end of said coil; and an output node to which an output voltage of said coil is applied via said diode, wherein in the standby mode, the output voltage of said coil driven by the switching operation of said switching element is rectified by said diode and the rectified voltage is generated at said output node as the power output voltage of said voltage step up DC/DC converter, when the power output voltage of said voltage step up DC/DC converter is equal to or lower than the second set voltage, and the switching operation of said switching element is stopped and the power input voltage from said supply voltage source having passed through said coil and said diode is generated at said output node as the power output voltage of said voltage step up DC/DC converter, when the power output voltage of said voltage step up DC/DC converter exceeds the second set voltage.

4. The switching regulator according to claim 2, wherein said voltage step up DC/DC converter comprises:

a detection circuit for detecting the power output voltage of said voltage step up DC/DC converter and generating a detected voltage;

a chopping wave generation circuit for generating a chopping wave signal;

a comparator for comparing said detected voltage and said chopping wave signal, and generating a comparison result signal;

a switching element for performing a switching operation according to said comparison result signal;

a coil for receiving the power input voltage from said supply voltage source at one end and the other end being driven by the switching operation of said switching element;

a diode connected to the other end of said coil; and an output node to which an output voltage of said coil is applied via said diode, wherein in the standby mode, the output voltage of said coil driven by the switching operation of said switching element is rectified by said diode and the rectified voltage is generated at said output node as the power output voltage of said voltage step up DC/DC converter, when the power output voltage of said voltage step up DC/DC converter is equal to or lower than the second set voltage, and the switching operation of said switching element is stopped and the power input voltage from said supply voltage source having passed through said coil and said diode is generated at said output node as the power output voltage of said voltage step up DC/DC converter, when the power output voltage of said voltage step up DC/DC converter exceeds the second set voltage.

5. The switching regulator according to claim 3, wherein said voltage step up DC/DC converter further comprises an AND circuit for stopping said switching element in an OFF state in the normal operating mode.

6. The switching regulator according to claim 4, wherein said voltage step up DC/DC converter further comprises an AND circuit for stopping said switching element in an OFF state in the normal operating mode.

\* \* \* \* \*